A. McCURRIER.
CIRCULAR SAW.
APPLICATION FILED JULY 23, 1919.
1,357,030.
Patented Oct. 26, 1920.
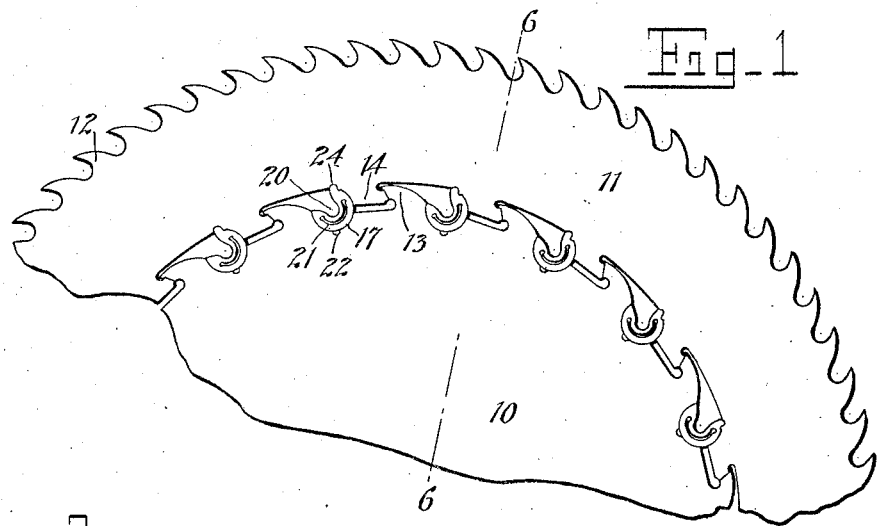
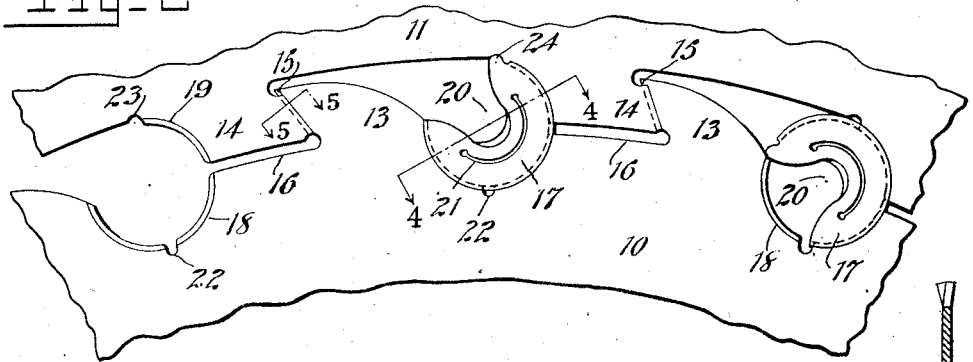
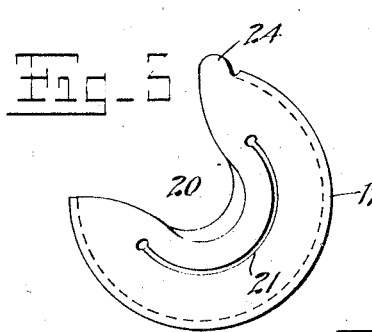
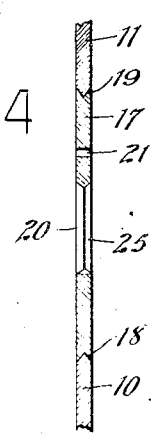
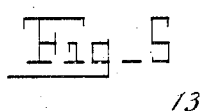
WITNESSES
INVENTOR
Alfred M. Currier
BY
ATTORNEYS

UNITED STATES PATENT OFFICE.

ALFRED M. CURRIER, OF ABERDEEN, WASHINGTON.

CIRCULAR SAW.

1,357,030.  Specification of Letters Patent.  Patented Oct. 26, 1920.

Application filed July 23, 1919. Serial No. 312,678.

*To all whom it may concern:*

Be it known that I, ALFRED M. CURRIER, a citizen of the United States, and a resident of Aberdeen, in the county of Grays Harbor and State of Washington, have invented a new and Improved Circular Saw, of which the following is a description.

My invention relates to circular saws and is adapted to be embodied in circular saws for log sawing, shingle sawing, etc.

The general object of my invention is to provide a circular saw so constructed as to have increased stability against distorting strains and tendencies set up in the saw when in action, whereby the saw will maintain its plane and thereby promote economy in the sawing by producing a kerf of the minimum width.

A further important object is to provide a saw with a detachable rim portion permitting renewal of the rim portion when required without the necessity of discarding the complete saw.

The invention also has for an important object to provide a circular saw so constructed that blade material of reduced thickness can be employed for a saw of given diameter as compared with the saws as generally formed.

A further object of the invention is to provide a saw so constructed that tensioning of the blade by hammering or rolling the same is made unnecessary.

More specifically, the invention has for objects to provide a locking means for the detachable rim so formed that the expansion of the rim portion when the saw is in action will not tend to lessen the holding function of the locking means but, on the contrary, will tend to increase the holding action, and to provide a locking means of a character to facilitate the attaching and detaching of the rim portion.

The stated objects and others as will appear are attained by a saw having the novel features hereinafter particularly described.

Reference is to be had to the accompanying drawings forming a part of this specification, it being understood that the drawings are merely illustrative of one example of the invention.

Figure 1 is a side view of a portion of a circular saw formed in accordance with my invention;

Fig. 2 is an enlarged fragmentary side view of the adjacent portions of the saw body and rim with the locking or holding means for the latter;

Fig. 3 is a side view of one of the rim locks or holders;

Fig. 4 is an enlarged cross section taken on the line 4—4, Fig. 2;

Fig. 5 is an enlarged cross section on the line 5—5, Fig. 2;

Fig. 6 is a cross section on the line 6—6, Fig. 1;

In carrying out my invention in accordance with the illustrated example, the body of the saw is made in the form of a disk 10, while the outer portion of the saw is in the form of a detachable rim 11, having the teeth 12 thereon. On the body 10, at the periphery, at spaced intervals, lugs 13 are produced, while coacting lugs 14 are provided on the rim 11 at the inner periphery. The front edge of each lug 13 and the opposed surface of the coacting lug 14 are at an angle of about 30° to a radial line for a purpose that will appear, said edges forming with the adjacent peripheral surfaces 16 of the disk a V-shaped recess, the walls of which are at an acute angle.

The lugs 14 of the rim are locked in engagement with the lugs 13 through the medium of locking devices or rim holders 17, which are adapted to engage seats formed partly in the periphery of the body 10 as indicated at 18 and partly by the front surfaces of the lugs 14 as indicated at 19. The seats thus presented by edges 18, 19 extend over half a circle and advantageously the seat portion 18 extends 180° while the seat portion 19 extends through an arc of approximately 90°. The seats are struck in the true arc of a circle and the back or seating edge of each holder 17 is correspondingly curved so that it may turn about its own axis through a sufficient arc to seat and unseat it. The holders 17 are resilient, springiness being given to them by forming them in curved shape presenting a recess 20 at the front edge and arms at opposite sides thereof so that the arms may be sprung toward and from each other. The resiliency of the holders is further increased by an arcuate slot 21 therein. Each seat portion 18 has an approximately central recess 22 so that the expansion or the contraction of the seat will not distort the same but may proceed from the center relatively to the ends. In the inner periphery of the rim 11 adjacent to the forward terminal of each seat portion 19 a recess 23 is produced and a corresponding projection 24 is formed on the adjacent terminal of each holder 17 adapted to be sprung into the recess to complete the locked engagement of the parts.

With the described construction in applying the holders 17 they are positioned as shown in Fig. 2 with the front edge recess 20 disposed inwardly or toward the periphery of the saw body 10 and the holder is then turned about its own axis on the seat 18, 19 until the projection 24 engages in the recess 23.

Preferably the disk body 10 tapers toward the periphery as best seen in Fig. 6 and the rim portion 11 is preferably made of uniform thickness and approximately equal to the thickness of the disk 10 at the periphery. By the described construction, that the purpose of the invention may better appear, it may be well to state that circular saws are not found as economical as band saws because producing a wider kerf owing to the expansion and distortion of the peripheral portion of the circular saw under the heat developed by friction increasing with the depth of the kerf. It is a rule to tension the circular saw by hammering or rolling with a view to withstand the strains of expansion. By the tensioning process the stability of the saw is greatly reduced. With my improved saw a saw blade of considerably smaller gage may be employed in making the saw because the rim is perfectly free to expand without setting up distorting strains or destroying the stability of the saw as a whole. In addition, the detachability of the rim permits of its renewal when required without the necessity of discarding the complete saw.

With the expansion of the rim and a resulting movement of the lugs 14 thereof outwardly relatively to the periphery of the disk body 10, the engagement of said lugs with the front edges 15 of the lugs 13 will result in an increasing pressure of the lugs 14 against the spring holders 17, whereby the latter maintain at all times an effective holding engagement with the rim.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A saw blade including a central body portion, and a separate rim thereon; together with resilient holders serving to lock the rim in position on the body, said holders being yieldable to expansion of said rim portion.

2. A circular saw blade including a central body, a separate rim, lugs on the body presenting edges each of which has a forward pitch at an angle to a radial line, and coacting lugs on the rim at the inner periphery and presenting edges in engagement with the mentioned edges of the first lugs; together with means to detachably hold said lugs in engagement.

3. A circular saw blade including a central body portion and a separate rim therefor free to expand independently of said body portion; together with means to detachably hold said rim in position while permitting its expansion, said means including resilient elements yieldable to relative expansion of the rim.

4. A circular saw blade including a central body portion, and a separate rim therefor, said body portion presenting edges at an angle to radial lines and said rim having members engaging said edges of the body; together with resilient holders for said rim, said holders being partly seated in the body of the saw and in the rim thereof, and adapted to be placed under tension by an expansion of the rim and the outward movement of mentioned members thereof along the mentioned angular edges of the body.

5. A circular saw blade comprising a central body portion, and a separate rim therefor; together with resilient holders for the rim, there being arcuate seats for said holders formed partly in the body of the blade at the periphery and partly in the rim at the inner periphery, the seating edges of the holders being curved to correspond with said seats.

ALFRED M. CURRIER.